United States Patent Office 2,927,092
Patented Mar. 1, 1960

2,927,092

POLYSTYRENE PHONOGRAPH RECORD COMPOSITIONS

Edward A. Naudain, Newark, Del., and Alfred L. Rummelsburg, Chadds Ford, Pa., assignors to Hercules Powder Company, Wilmington, Del., a corporation of Delaware No Drawing. Application March 7, 1958
Serial No. 719,754

5 Claims. (Cl. 260—27)

This invention relates to phonograph records and more particularly to phonograph records containing polystyrene and a resinous carbon-carbon condensate of rosin with styrene.

The art long has recognized that plastic phonograph record compositions should have the qualities of good flow characteristics and workability at molding temperatures, dimensional stability such as resistance to cold flow and warping, flexibility, toughness, resistance to shock, wear resistance to action of the needle on the sound track, high reproduction fidelity, freedom from record noise, and low cost. Many formulations have been devised in an effort to attain such qualities.

Phonograph record formulations based on polystyrene have been rather thoroughly investigated, and it was originally found that polystyrene records had poor resistance to abrasion caused by the playing needle of the record player. The addition of conventional fillers such as slate flour, clay, barytes, and carbon black was found to yield only slight improvement with respect to needle wear. It eventually was discovered that polystyrene's lack of resistance to needle abrasion was not due to lack of hardness but rather to a high coefficient of friction between the needle and the record groove surfaces, and it was found that the incorporation of appreciable amounts of waxes provided a record having improved wear resistance. Nevertheless, these wax modified polystyrene compositions were still found to have their shortcomings when used in the preparation of long-playing microgroove records.

The latter type of record contains a greater number of sound grooves per radial inch than the standard 78 r.p.m. records. To accommodate the much greater number of sound grooves on the microgroove type records, the grooves and the walls between successive grooves are necessarily of smaller dimensions than on the standard records. The finer grooves and thinner walls of the microgroove records are highly susceptible to wear by the play back stylus, causing loss of sound fidelity and higher noise level. Even the wax modified polystyrene records have been comparatively susceptible to these difficulties, and there has been a need for a polystyrene composition which would provide the required wear properties.

In accordance with this invention it has been found that particularly satisfactory phonograph records may be obtained by molding the records from a composition comprising a polystyrene having an average molecular weight between 40,000 and 150,000 as determined by viscosity measurements, about 1 to about 15% by weight based on the polystyrene of a natural wax, and about 5 to about 15% by weight based on the polystyrene of a resinous product of carbon-carbon condensation in the presence of an acid-acting condensation catalyst of rosin with styrene, the molar ratio of rosin to styrene in the condensation product being from about 0.1 to 20. Fillers, pigments, and mold lubricants may be included in the record compositions if desired.

The compositions of this invention are moldable by injection molding, thus providing for economical manufacture. They also completely fill the record mold and faithfully reproduce all depressions and ridges of the mold face. The molded record plays well from the very beginning and exhibits much greater life with substantially no background noise and no deterioration or increase in this characteristic. The compositions may be used for molding both microgroove and standard 78 r.p.m. records and are moldable by compression molding as well as injection methods.

The following example constitutes a specific illustration of the preparation, composition, and properties of the phonograph records of this invention. All parts are on a parts by weight basis.

Example

A record composition composed of 81.41 parts of polystyrene having a molecular weight of about 75,000, 5.34 parts of a mixture of microcrystalline and carnauba waxes in a 2:1 weight ratio, 2 parts of carbon black, 11 parts of rosin-styrene condensate (24% combined styrene; 9.1% unsaponifiables; acid number, 120–121; drop softening point, 120–122° C.), and 0.25 part of zinc stearate was prepared by milling these components together for 10 minutes at a temperature of 310° F. The composition had good workability and a sample thereof when subjected to Tinius-Olsen flow measurement at 180° F. and 300 p.s.i. gave the following values: 0.18 inch at 20 seconds; 0.47 inch at 40 seconds; 0.91 inch at 60 seconds; 1.24 inches at 80 seconds; 1.46 inches at 100 seconds; and more than 1.50 inches at 120 seconds. The composition was molded into phonograph records in a standard press having matrices of sound recordings. Test pieces cut from these records had a Rockwell hardness value (R scale) of 112, an angle of bend of 35°, a flexural strength of 9350±70 p.s.i. and a flexural modulus of 380,000 p.s.i. The record itself was highly resistant to needle wear.

When the rosin-styrene condensate was omitted from the above composition and replaced by an equivalent amount of the polystyrene, the resulting composition had Tinius-Olsen flow values which were as follows: 0.15 inch in 20 seconds; 0.34 inch in 40 seconds; 0.59 inch in 60 seconds; 0.76 inch in 80 seconds; 0.91 inch in 100 seconds; and 1.04 inches in 120 seconds. Test samples of the records molded from this composition exhibited a flexural strength of 12,500±200 p.s.i., a flexural modulus of 410,000 p.s.i., a Rockwell hardness value of 117, and a 63±7° angle of bend. The record was not resistant to needle wear and the fidelity was relatively poor. The grooves were not exact duplications of the metal mold.

The polystyrenes most satisfactory for use in the compositions of this invention are those having an average molecular weight between 40,000 and 150,000 and preferably between 50,000 and 80,000 for optimum suitability with regard to moldability, minimum strain content, and good wearing performance. Polystyrenes greater than 80,000 and up to 150,000 average molecular weight can be used but tend to produce records more or less highly strained, particularly with injection molding. Polystyrenes of less than 40,000 average molecular weight are brittle.

The waxes yielding the most beneficial results are the natural waxes, for example, the ester type waxes such as carnauba, candelilla, montan, beeswax, cotton wax, and the like. These waxes are principally mixtures of high molecular weight esters of higher monohydric alcohols and higher fatty acids, free acids and alcohols, and long chain aliphatic hydrocarbons. Also useful are the essentially glycerol esters of higher fatty acids such as japan wax, myrtle wax, and the synthetic waxes obtained by hydrogenation of vegetable and animal oils such as soya bean oil, cotton seed oil, and castor oil. Another suitable class of natural waxes are the unsaponifiable hydrocarbon mineral waxes, such as paraffin waxes, microcrystalline waxes, ozokerite, and ceresin. The amount of wax may be varied from about 1 to about 15% by weight based on the polystyrene. A preferable range is from about 2 to about 7%.

The rosin-styrene condensate used in producing the phonograph record compositions of this invention is the resinous product of carbon-carbon condensation in the presence of an acid-acting condensation catalyst of rosin with styrene, the molar ratio of rosin to styrene in the condensation product being from about 0.1 to 20. The condensate used in the example was prepared with boron trifluoride as the catalyst. The condensate is a stabilized resinous material having decreased tendency to absorb oxygen. It has an unsaponifiable content not substantially greater and a melting point substantially higher than the corresponding values of the rosin from which it is made. It is characterized by solubility in aromatic, paraffinic, and olefinic hydrocarbon solvents, turpentine, and drying oils. Solubility in lower alcohols is generally low, but increases as the molecular weight of the alcohol is increased. Additional characteristics as well as methods of preparing the condensate are given in U.S. Patent 2,532,120 to A. L. Rummelsburg. The amount of the condensate used in accordance with this invention will be from about 5 to about 15% by weight based on the polystyrene, preferably from about 8 to about 13%.

The fillers which may be used in the phonograph records may be any of those generally used by the art, such as china clays and other smooth clays, finely ground slate flour, barytes or precipitated barium sulfate, kieselguhr, silica powder, carbon black, marble flour, whiting, and metal oxides such as titanium dioxide and zinc oxide. Cotton floc and ground-up paper also may be used. The filler content may be varied through very wide limits. It may be from 0 to about 75% by weight based on the modified polystyrene composition when such compositions are to be compression molded. A maximum of about 30% filler may be used when the record is to be injection molded.

The modified polystyrene compositions also can contain coloring matter such as carbon black or other pigment, and it also may contain metal soaps such as the aluminum, iron, calcium, barium, manganese, sodium, lead, and zinc stearates, oleates, and palmitates. These soaps may be present in small amounts, for example, from about 1 to about 5% by weight based on the modified polystyrene composition.

The phonograph records prepared from the compositions of this invention are distinct improvements over the records made from previously known polystyrene formulations. The improvements are shown by such physical characteristics as increased resistance to wear due to less drag of the needle in the groove, improved duplication of the metal mold, less rubber-like properties, and greater strength from the outer edge to the center of the record. The latter results from the enhanced compatibility of the various components of the composition, this being contributed to by the presence of the rosin-styrene condensate. Presence of the condensate also results in a unique distribution of the wax on the surface of the record, thereby preventing bloom. The composition itself has better flow than an unmodified polystyrene, thereby resulting in better groove definition during the molding operation.

What we claim and desire to protect by Letters Patent is:

1. A phonograph record composition comprising a polystyrene having an average molecular weight between 40,000 and 150,000 as determined by viscosity measurements, about 1 to about 15% by weight based on the polystyrene of a natural wax, and about 5 to about 15% by weight based on the polystyrene of a resinous product of carbon-carbon condensation in the presence of an acid-acting condensation catalyst of rosin with styrene, the molar ratio of rosin to styrene in the condensation product being from about 0.1 to 20.

2. The composition of claim 1 wherein the polystyrene has an average molecular weight between 50,000 and 80,000.

3. The composition of claim 1 wherein the natural wax is a microcrystalline wax.

4. The composition of claim 1 wherein the natural wax is carnauba wax.

5. The composition of claim 1 and up to about 75% by weight based on the composition of a finely divided mineral filler.

References Cited in the file of this patent

UNITED STATES PATENTS

| | | |
|---|---|---|
| 2,439,207 | Feagin | Apr. 6, 1948 |
| 2,532,120 | Rummelsburg | Nov. 28, 1950 |
| 2,681,323 | Groff et al. | June 15, 1954 |
| 2,736,715 | Brunner | Feb. 28, 1956 |

FOREIGN PATENTS

| | | |
|---|---|---|
| 624,792 | Great Britain | June 16, 1949 |